United States Patent [19]
Betnar

[11] Patent Number: 4,602,404
[45] Date of Patent: Jul. 29, 1986

[54] FISH FILLETING DEVICE

[76] Inventor: Clyde Betnar, 850 Callahan, Rogers, Ark. 72756

[21] Appl. No.: 689,290

[22] Filed: Jan. 7, 1985

[51] Int. Cl.$^4$ ............................................. A22C 25/16
[52] U.S. Cl. ........................................ 17/56; 17/21; 17/62
[58] Field of Search .................. 17/21, 46, 56, 61, 62; 99/589

[56] References Cited

U.S. PATENT DOCUMENTS

| | | | |
|---|---|---|---|
| 1,847,536 | 3/1932 | Pruefer | 99/589 |
| 2,539,692 | 1/1951 | Hickman et al. | 99/589 |
| 2,605,495 | 8/1952 | Daniels | 99/589 X |
| 2,645,812 | 7/1953 | Jensen | 17/62 |
| 2,714,221 | 8/1955 | Gradoff et al. | 17/46 X |
| 2,722,255 | 11/1955 | Townsend | 99/589 |
| 2,738,544 | 3/1956 | Stevenson et al. | |
| 2,988,124 | 6/1961 | Massengill | 99/589 |
| 3,052,914 | 9/1962 | Luedtke | |
| 3,077,632 | 2/1963 | Brandes et al. | |
| 3,164,858 | 1/1965 | DeMoss | |
| 3,542,103 | 11/1970 | Townsend | 99/589 |
| 3,596,308 | 8/1971 | Kenney | |

Primary Examiner—John Sipos
Assistant Examiner—Steven P. Weihrouch
Attorney, Agent, or Firm—Schmidt, Johnson Hovey & Williams

[57] ABSTRACT

An inexpensive, portable device for filleting fish is provided which has a pair of flexible, side-by-side rollers that bow outwardly in opposite directions to engage the sides of a fish therebetween. The rollers have a plurality of spaced protuberances that firmly grip the fish, yet the rollers have sufficient resiliency to maintain the vertebral column or "backbone" of the fish in perfect alignment with an elongated opening between a pair of downstream, side-by-side, elongated blades. As the rollers are turned to advance the fish, two opposite fillet portions are cut by the blades as well as a narrow, bony, vertebral portion, and the blades are closely adjacent the rollers such that guide means or manual positioning is unnecessary. Preferably, the blades either reciprocate as the rollers turn or, in another embodiment, are mounted on an endless belt similar in nature to a band saw. In an alternate form of the invention, a flat tray is inserted into the device and extends through the opening between the rollers and the opening between the blades, such that a previously filleted portion of the fish may be reinserted to engage a single blade for removing a thin skin layer.

8 Claims, 9 Drawing Figures

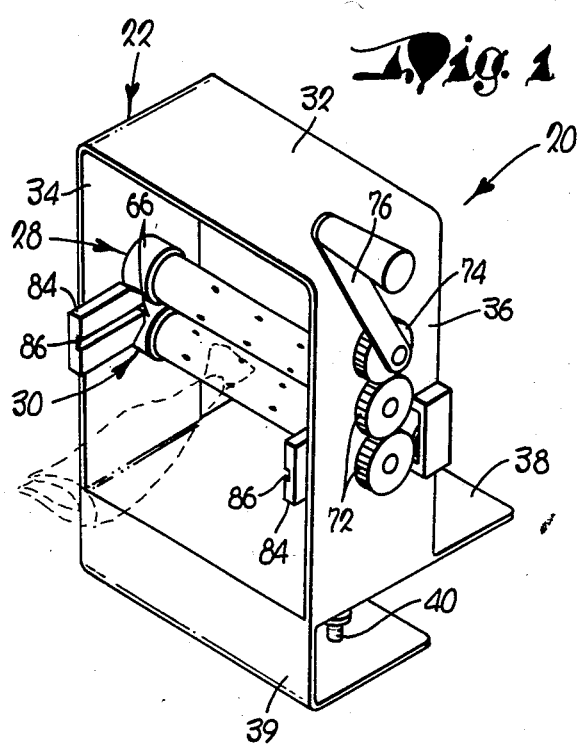
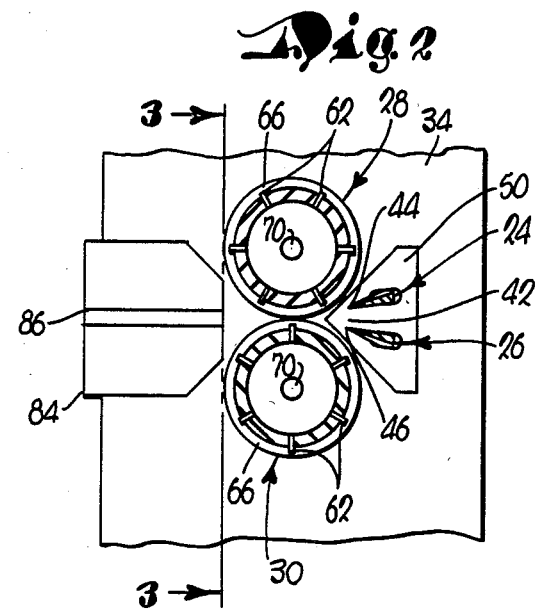
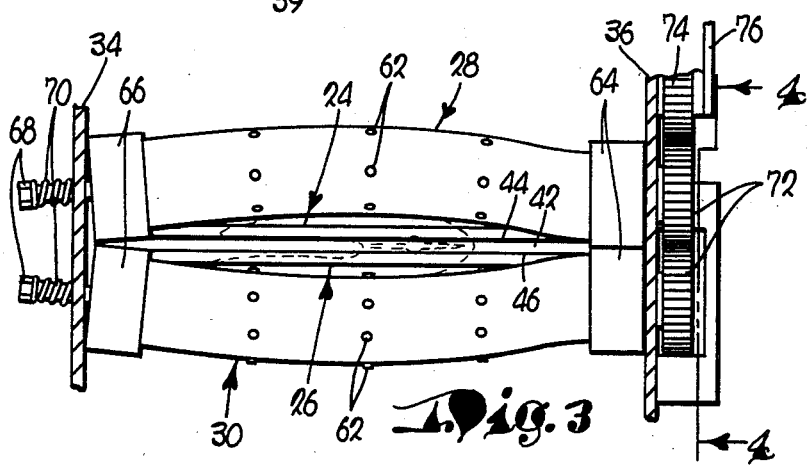
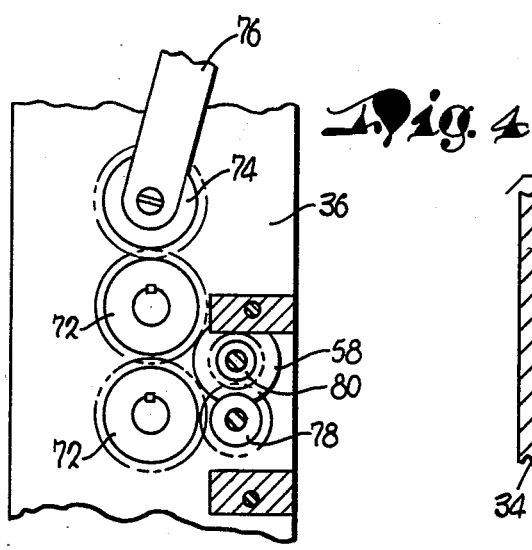
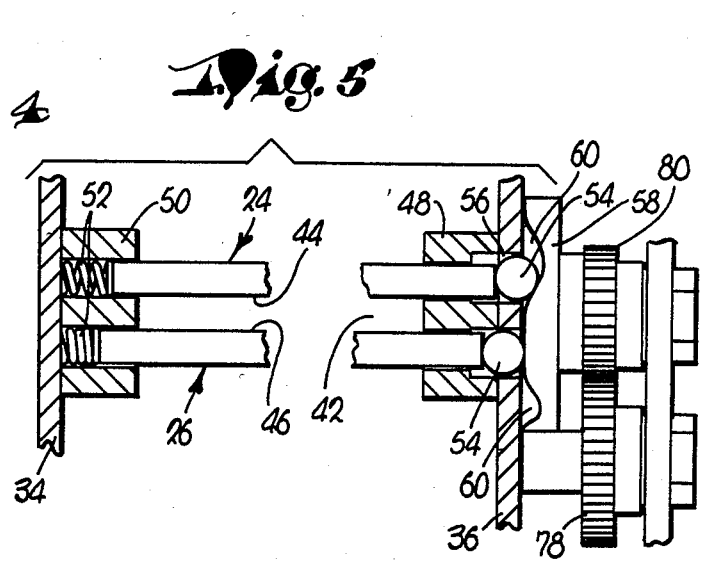

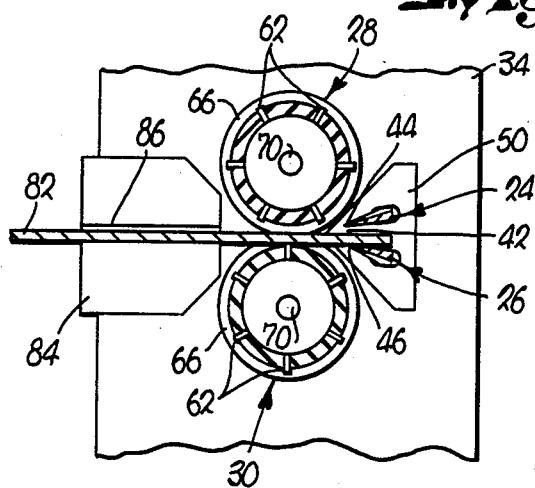
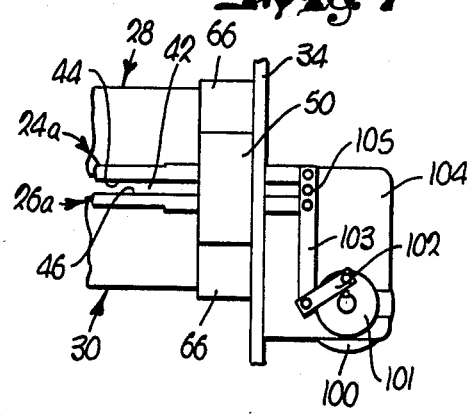
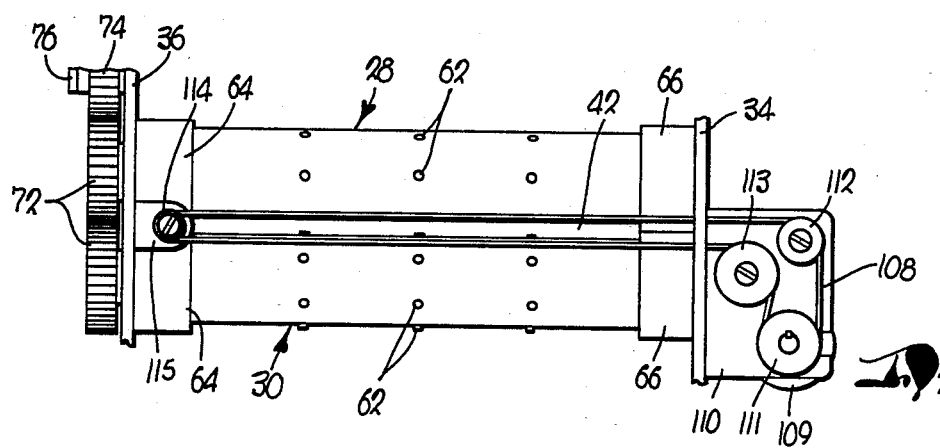
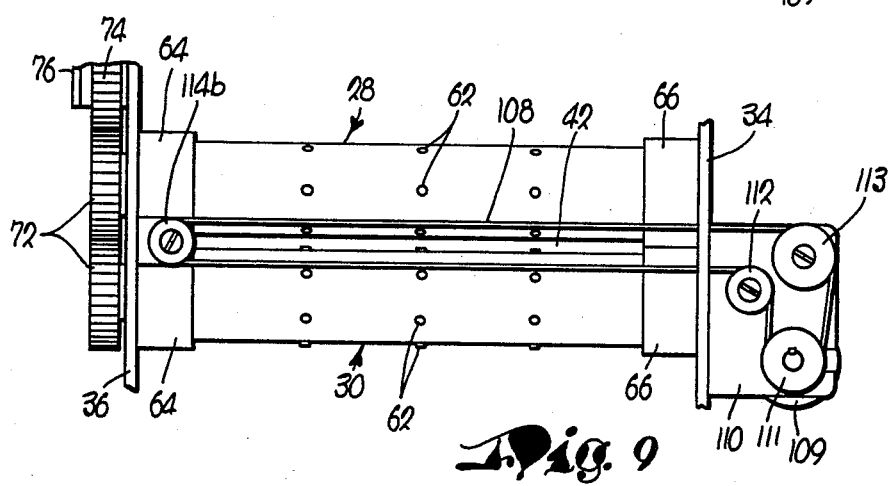

FISH FILLETING DEVICE

BACKGROUND OF THE INVENTION

1. Field of the Invention

The present invention relates to an apparatus for filleting fish.

2. Description of the Prior Art

The joy which follows a day of successful angling can be greatly diminished by the unpleasant task of fish filleting which must necessarily follow. When done by hand, this time consuming and troublesome task can inefficiently leave a large amount of flesh on the bones or, conversely, can cut into the skeleton to yield an unsatisfactory, bony fillet. Hand filleting is also notorious for causing serious knife injuries which occur as the angler struggles with the slippery, floppy catch. Unfortunately, machines which have been constructed to date for filleting fish are inefficient as well as expensive.

One example of a filleting machine is disclosed in U.S. Pat. No. 2,738,544, issued Mar. 20, 1956. In this machine, a V-shaped trough consisting of a pair of spaced endless belts carries a fish into engagement with a pair of vertical sawblades in an attempt to cut two opposite fillet portions and a central bony portion, the latter of which is then discarded. However, it would appear that the pair of belts cannot satisfactorily grasp the fish while the fillets are severed, especially when the fish is somewhat lightweight and incapable of self-support on the belts. As a result, use of this device would apparently be limited to preparing large fish caught by commercial fishing operations.

Another fish filleting machine is disclosed in U.S. Pat. No. 3,596,308, issued Aug. 3, 1971. In this apparatus, a fish is fed tail first through a pair of spaced, elongated blades, and a pair of rotating splined rollers disposed downstream of the blades then attempts to grasp the tail and pull the fish through the blades to cut the fillet portions. Unfortunately, the pulling force exerted by the rollers could apparently break the vertebral column or so-called backbone of the fish and thus prevent further filleting, especially when the fish is somewhat small. Also, the tail when emerging from the blades may flop and miss the rollers such that the operator must retract the fish and then reinsert the latter for proper engagement. Additionally, if the tail is thick an upstream thrust will be necessary to force the fish into the blades for cutting until the tail can finally be grasped by the splined rollers. To overcome this latter deficiency, a V-shaped conveyor is often utilized upstream of the rollers and the operator then steadies the top portion of the fish with a shield or hood to guide the fish properly toward the blades. Obviously, such a complicated and expensive device is cumbersome to use as well as subject to numerous mechanical breakdowns.

SUMMARY OF THE INVENTION

The present invention overcomes the disadvantages outlined above. The fish filleting device can efficiently grasp the fish and slice the fillet portions in an accurate, reliable and efficient manner.

More particularly, the device includes a pair of side-by-side, elongated, flexible rollers which are upstream of a pair of side-by-side, elongated blades. The blades are closely adjacent the rollers and the cutting edges of the blades protrude through an imaginary plane tangent to one side of the periphery of both of the rollers. Also, the rollers are resiliently flexible relative to each other such that as a fish is inserted toward an opening between the rollers the latter bow outwardly in opposite directions and tightly grasp a large surface area on the sides of the fish. Thus, the rollers prevent lateral movement of the fish as the latter is advanced toward the blades.

The longitudinal axes of the rollers is normally parallel to the longitudinal axes of the blades. Consequently, each roller can flex outwardly an equal distance from its normally straight disposition such that the fish is held in alignment with the blades, and thus the backbone or vertebral column of the fish is directed into the elongated space between the blades whereby virtually none of the bones are included in the fillet portions. In preferred forms, the blades reciprocate or are mounted on an endless belt for efficient cutting.

Additionally, the cooperation between the rollers and the blades of the instant invention can be further utilized to skin a previously filleted portion by the utilization of a novel tray which is inserted into the space between the rollers and fixed for protrusion into the space between the blades. A filleted portion can then be pushed toward the roller on top of the tray whereupon the roller will grasp one side of the fillet and force the same toward the blade. Also, the tray is fixed to a position closely adjacent the overlying blade such that an extremely thin skin layer can pass between the blade and the tray while the meat is directed over the blade. Noteworthy is the fact that this skinning operation is impracticable on prior art devices having blades upstream of the conveying means.

BRIEF DESCRIPTION OF THE DRAWINGS

FIG. 1 is a perspective view of the fish filleting device in accordance with one embodiment of the invention;

FIG. 2 is an enlarged, fragmentary, vertical section of the rollers, blades, and support of the device shown in FIG. 1;

FIG. 3 is a reduced vertical front view, partially in section, taken along 3—3 of FIG. 2;

FIG. 4 is a vertical side view, partially in section, taken along line 4—4 of FIG. 3;

FIG. 5 is an enlarged, fragmentary, vertical front view, partially in section, of the invention as shown in FIG. 1 and detailing the blades and reciprocating means;

FIG. 6 is a view similar to FIG. 2, additionally showing the position of the tray when installed for skinning the fish;

FIG. 7 is an enlarged, fragmentary, side elevational view illustrating the use of a motor for reciprocating the blades according to another embodiment;

FIG. 8 is an enlarged, rear elevational view of the device according to yet another embodiment wherein an endless belt cutting blade is utilized; and FIG. 9 is a view similar to FIG. 8 showing an alternate pulley arrangement for spacing the belt to accommodate larger fish.

DETAILED DESCRIPTION

In general, the fish filleting device 20 comprises a rectangular support 22, a pair of spaced, side-by-side, elongated blades 24, 26, coupled to the support 22, and a pair of resiliently flexible rollers 28, 30 connected to the support 22 upstream of the blades 24, 26. The rollers 28, 30 bow outwardly to engage the sides of a fish and thereafter push the fish toward the blades 24, 26 such that two opposite fillet portions and a narrow, central vertebral portion are cut.

Referring first to FIG. 1, the support 22 includes a flat top 32, a pair of spaced flat sides 34, 36 perpendicular to the top 32, and an enlarged flat bottom 38 which is parallel to the top 32. Additionally, an L-shaped bracket 39 extends below the bottom 38 to form a channel for receiving a suitable countertop or other horizontal supporting member, whereupon a plurality of clamps 40 which threadably engage the bracket 39 may be tightened to secure the support 22 firmly in place.

Referring to FIG. 2, each of the blades 24, 26 has an outer cutting edge 44, 46 respectively and the blades 24, 26 are spaced to create an opening 42 sufficient to receive the vertebral column of a fish therebetween. I have observed that the width of the opening 42 should preferably be 7/32 of an inch to accommodate fish weighing approximately ½ to 1¼ pounds.

As seen in FIG. 5, the blades 24, 26 are longitudinally reciprocable within a pair of slotted guides 48, 50 which are secured to the sides 34, 36 respectively. Each of the blades 24, 26 are yieldably biased to the right, viewing FIG. 5, by means of a spring 52. A ball bearing 54 engages each of the blades 24, 26 remote from the spring 52 and protrudes through an opening 56 in the side 34 to engage a disc 58. The disc 58 is rotatably mounted on the side 34 and has a plurality of radially extending grooves 60 which sequentially engage the ball bearings 54 as the disc 58 is turned.

Referring to FIG. 2, the rollers 28, 30 are preferably hollow and constructed of a synthetic resinous material. Each of the rollers 28, 30 has a plurality of spaced protuberances or studs 62 which extend radially outwardly from the rollers 28, 30. Viewing FIG. 3, the righthand end of each of the rollers 28, 30 is received within a round end cap 64 which is mounted for rotation on the side 36. The lefthand end of each of the rollers 28, 30 is received within an end cap 66 adjacent the side 34. A bolt 68 extends through a spring 70, the side 34 and each of the end caps 66 to yieldably bias the latter toward a position parallel to the side 34. As a result, the spring 70 as well as the flexible, resilient nature of the rollers 28, 30 bias the longitudinal axes of the rollers 28, 30 toward a normally straight configuration and parallel orientation relative to the longitudinal axes of the blades 24, 26.

A means for rotating each of the rollers 28, 30 about their respective longitudinal axes comprises a pair of intermeshing spur gears 72, each of which affixedly engages one of the end caps 64 for rotation therewith. The upper gear 72 also meshingly engages a gear 74 that is revolubly mounted on the side 36 and is secured to a handle 76.

The means for rotating the rollers 28, 30 is also operable to simultaneously reciprocate the blades 24, 26. Viewing FIG. 4, the lower spur gear 72 meshingly engages a smaller gear 78 which, in turn, drivingly engages a spur gear 80 that is secured to the disc 58. As the disc 58 is turned, each of the blades 24, 26 reciprocates as the spring 52 forces the ball bearing 54 to oscillate between a position engaging the groove 60 and the flat, uncut remaining portions of the disc 58. Thus, as the handle 76 is turned, the gears 72, 72 rotate the rollers 28, 30 simultaneously while the gear 80 revolves the disc 58 to reciprocate the blades 24, 26.

As illustrated in FIG. 6, a flat tray 82 is selectively fixable in a location wherein the tray 82 extends through the opening between the rollers 28, 30 and the opening 42 between the blades 24, 26. A block 84 is mounted on each of the sides 34, 36 and has an internal slot 86 which slidably receives the tray 82.

In the embodiment as illustrated in FIG. 7, each of the blades 24a, 26a is longitudinally reciprocable by means of an electric motor 100 which may be powered either by AC or DC current. The motor 100 is keyed to a wheel 101 that pivotally supports a link 102 which, in turn, is pivotally coupled to an arm 103. A member 104 which supports the motor 100 also supports the arm 103 for pivotal movement about a point 105. The arm 103 is also pivotally connected on opposite sides of the point 105 to a portion of the blades 24a, 26a which extends through the side 34. The motor 100 is operable to turn the wheel 101 and swing the link 102, whereupon the arm 103 pivots about the point 105 to reciprocate the blades 24a, 26a.

In the embodiment as illustrated in FIGS. 8-9, the blades are mounted on an endless belt 108 which is movable around a closed loop path of travel. A motor 109 is secured to a member 110 and is keyed to a pulley 111. The belt 108 is driven by the pulley 111 and travels around a pair of pulleys 112, 113 revolubly mounted on the member 110, and the belt 108 is also trained near the opposite end of the rollers 28, 30 to a pulley 114 which is mounted for rotation on a bracket 115.

Comparing FIG. 8 and FIG. 9, it should be noted that the longitudinal axes of the blades 24, 26 are shiftable toward and away from each other to a preselected position as the diameter of the pulleys is varied. In FIG. 9, the pulleys 112, 113 are interchanged from their position in FIG. 8, and the outer pulley 114 is replaced with a larger pulley 114b such that the opening 42 between the opposite sides of the belt 108 is shifted to a somewhat larger dimension.

OPERATION

In use, the sides of the fish are engaged between the rollers 28, 30 such that the latter both bow outwardly to conform substantially to the configuration of each side of the fish. Although not essential, the fish may be beheaded and gutted before being inserted tail first into the nip between the rollers 28, 30.

As the handle 26 is turned, the rollers 28, 30 rotate and the protuberant studs 62 grip the tail for advancement of the fish toward the opening 42 between the blades 24, 26. Noteworthy is the fact that the rollers 28, 30, are resiliently biased toward a straight, parallel configuration such that the fish is supported in parallel alignment with the longitudinal axes of the parallel blades 24, 26. Thus, as the rollers 28, 30 continue to advance the fish, the central vertebral portion of the fish is precisely guided toward the closely proximate opening 42 between the blades 26, 28 whereupon two opposite fillet portions and a narrow bony, central vertebral portion of the fish are cut.

The relatively close spacing between the cutting edges 44, 46 and the rollers 28, 30 insures that the fish will not laterally shift away from an aligned position relative to the opening 56 either before or during the cutting operation. The tight grasp exerted by the flexible rollers 28, 30 maintains the fish in complete alignment with the opening 42 such that other additional guide means are unnecessary, in stark contrast to prior art constructions. Additionally, the operator need not exert an initial thrust to initiate the cut by the blades 24, 26 because the rollers 28, 30 engage and advance the fish before the blades 24, 26 begin the cut.

The flexible nature of the rollers 28, 30 also renders unnecessary the use of a floating gear drive which otherwise would be required if the rollers were instead rigid and movable in parallel alignment toward and away from each other to grasp the fish. More importantly, the resultant bow of the rollers 28, 30 in use ensures that the frictional resistance or gripping force of the rollers 28, 30 is distributed over a large surface area of the latter as well as the fish; such would not be possible if rigid, straight rollers were employed.

As noted by the comparable size between the gears 72, 72 and the gears 78, 80, the blades 24, 26 will reciprocate at a high speed to efficiently sever two filleted portions as the fish is advanced.

Referring to FIG. 6, the tray 82 conveniently supports a filleted portion as the latter is reinserted into the device 20 for subsequent skinning. I have found that satisfactory results are obtained when the distance between the upper edge of the tray 82 and the cutting edge 44 of the upper blade 24 is approximately 1/32 of an inch. As the handle 76 is turned, the filtered portion is inserted with its skin side down until engagement with the roller 28, whereupon the latter will grip and advance the portion toward the blade 24 such that a very thin skin layer is removed from the meat.

In the motorized embodiments as illustrated in FIGS. 7 and 8-9, the movement of the blades 24, 26 is not synchronous with the rollers 28, 30, whereby the blades 24, 26 are operable to move at a very high speed and the fish can be advanced manually in accordance with the rate of cutting. I have observed that a higher speed is particularly desirable when the tray 82 is utilized to support the fish for skinning. The motors 100, 109 may be either AC or DC according to the type of power which is conveniently available.

I claim:

1. A fish filleting device comprising:
   a support;
   a pair of side-by-side elongated blades coupled to said support,
   said blades being spaced sufficiently to receive the vertebral column of the fish therebetween;
   a pair of side-by-side, elongated rollers connected to said support; and
   means for rotating said rollers about their respective longitudinal axes,
   said rollers being yieldable toward a concave configuration wherein said longitudinal axes of said rollers are outwardly bowed in opposite directions,
   said rollers being sufficiently resilient and flexible such that said rollers are biased toward a straight configuration wherein the longitudinal axes of said rollers are parallel to the longitudinal axes of said blades,
   said rollers being disposed forwardly and closely adjacent said blades,
   said resiliency and flexibility of said rollers being sufficient to firmly engage the sides of the fish therebetween and also maintain the vertebral column of the fish in parallel alignment with the opening between said blades,
   said rollers being operable to push said fish toward said blades such that the vertebral column of said fish is guided into the opening between said blades,
   whereby said blades are operable to cut said fish into the opposite fillet portions and a narrow, central vertebral portion as said rollers advance the fish.

2. The invention of claim 1, each of said rollers having a plurality of spaced protuberances for gripping the fish.

3. The invention of claim 2, each of said protuberances being a stud extending radially outward from said rollers.

4. The invention of claim 1, said blades being longitudinally reciprocable.

5. The invention of claim 4, said means for rotating said rollers also being operable to simultaneously reciprocate said blades.

6. The invention of claim 1, said blades being mounted on an endless belt movable around a closed loop path of travel.

7. The invention of claim 1, the longitudinal axes of said blades being shiftable toward and away from each other to a preselected position.

8. The invention of claim 1; additionally comprising a flat tray being selectively fixable in a location such that the tray extends through the space between the rollers and the opening between the blades whereby one of the fillet portions of the fish may be reinserted into a position for engagement with one of said rollers and thereafter advanced toward one of said blades for removing the skin.

* * * * *